(12) United States Patent
Jiang (10) Patent No.: US 9,940,485 B2
(45) Date of Patent: Apr. 10, 2018

(54) PASSWORD ENTRY METHOD AND SYSTEM (71) Applicant: SHENZHEN TCL NEW TECHNOLOGY CO., LTD, Shenzhen, Guangdong (CN)

(72) Inventor: Feng Jiang, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 172 days.

(21) Appl. No.: 15/027,285

(22) PCT Filed: Dec. 11, 2014

(86) PCT No.: PCT/CN2014/093588
§ 371 (c)(1),
(2) Date: Apr. 5, 2016

(87) PCT Pub. No.: WO2016/000417
PCT Pub. Date: Jan. 7, 2016

(65) Prior Publication Data
US 2016/0247000 A1    Aug. 25, 2016

(30) Foreign Application Priority Data
Jul. 3, 2014  (CN) .......................... 2014 1 0315922

(51) Int. Cl.
*G06F 21/84* (2013.01)
*G06F 3/041* (2006.01)
(Continued)

(52) U.S. Cl.
CPC .............. *G06F 21/84* (2013.01); *G06F 3/041* (2013.01); *G06F 3/04886* (2013.01);
(Continued)

(58) Field of Classification Search
USPC ......................................................... 726/26
See application file for complete search history.

(56) References Cited

U.S. PATENT DOCUMENTS 4,538,495 A  *  9/1985  Sato .......................... G10H 1/24
84/477 R
5,386,496 A  *  1/1995  Arai .......................... G01J 3/46
358/518
(Continued)

FOREIGN PATENT DOCUMENTS

JP           62201445 A  *  9/1987  ............... G03F 5/00

OTHER PUBLICATIONS

15027285NPL results, Patent results, Potential references, Search strategy, CN 102819385, JPH05119754, PCT-CN2014-093588.*

*Primary Examiner* — Taghi Arani
*Assistant Examiner* — Badri Champakesan (57) ABSTRACT

Disclosed are a password entry method and system. In the present invention, an intelligent display terminal receives a password entry instruction of a user, and randomly generates image data of a soft keyboard; the intelligent display terminal decomposes the image data of the soft keyboard into image data of a first soft keyboard and image data of a second soft keyboard by using a subtractive color process; the intelligent display terminal displays an image of the first soft keyboard according to the image data of the first soft keyboard, and sends the image data of the second soft keyboard to a portable display terminal; and the portable display terminal combines the image data of the first soft keyboard and the image data of the second soft keyboard by using an additive color process to restore an image of the soft keyboard, and displays the image of the soft keyboard.

10 Claims, 3 Drawing Sheets

(51) Int. Cl.
*G06F 3/0488* (2013.01)
*G06F 21/36* (2013.01)
*G06F 21/60* (2013.01)
*G06T 11/00* (2006.01)

(52) U.S. Cl.
CPC .............. *G06F 21/36* (2013.01); *G06F 21/60* (2013.01); *G06T 11/001* (2013.01); *G06F 2221/031* (2013.01)

(56) References Cited

U.S. PATENT DOCUMENTS

| | | | | |
|---|---|---|---|---|
| 5,483,235 A * | 1/1996 | Hanson | ................... | B41J 5/105 341/20 |
| 5,626,429 A * | 5/1997 | Choate | ................... | G06F 3/0219 400/472 |
| 2005/0213129 A1* | 9/2005 | Matama | ............... | H04N 1/6011 358/1.9 |
| 2009/0303200 A1* | 12/2009 | Grad | ..................... | G06F 3/0416 345/173 |
| 2011/0206285 A1* | 8/2011 | Hodge | ................... | G06F 21/84 382/224 |
| 2012/0124654 A1* | 5/2012 | Senac | ..................... | G06F 21/36 726/7 |
| 2012/0169606 A1* | 7/2012 | Xia | ........................ | G06F 3/0236 345/168 |
| 2012/0306740 A1* | 12/2012 | Hoda | ...................... | G06F 3/017 345/156 |
| 2014/0026193 A1* | 1/2014 | Saxman | .................. | G06F 21/33 726/4 |
| 2014/0098141 A1* | 4/2014 | Sen | ...................... | G06F 3/04886 345/660 |
| 2014/0123274 A1* | 5/2014 | Chen | ....................... | G06F 21/46 726/18 |
| 2014/0245433 A1* | 8/2014 | Bao | ......................... | G06F 21/31 726/19 |
| 2014/0250120 A1* | 9/2014 | Mei | ....................... | G06F 3/0488 707/736 |
| 2014/0300835 A1* | 10/2014 | Chu | ..................... | G06F 3/0412 349/12 |
| 2014/0321703 A1* | 10/2014 | Inomata | ............. | G06K 9/00624 382/103 |
| 2015/0137944 A1* | 5/2015 | Fuerth | ..................... | H04L 63/083 340/5.85 |
| 2015/0188896 A1* | 7/2015 | Slick | ................... | H04L 63/0428 713/171 |
| 2015/0243081 A1* | 8/2015 | Ueno | .................... | A63F 9/0826 345/633 |
| 2017/0131898 A1* | 5/2017 | Markiewicz | ........ | G06F 3/04886 |
| 2017/0177971 A1* | 6/2017 | Hong | ....................... | G06T 7/90 |
| 2017/0323522 A1* | 11/2017 | Hilbert | ................ | G07F 17/3218 |

* cited by examiner

| Cyan | Yellow | Yellow | Yellow | Cyan |
|---|---|---|---|---|
| Cyan | Yellow | Cyan | Cyan | Cyan |
| Cyan | Yellow | Yellow | Yellow | Cyan |
| Cyan | Yellow | Cyan | Cyan | Cyan |
| Cyan | Yellow | Yellow | Yellow | Cyan |

FIG. 2B (B)

| Blue | Red | Green | Red | Green |
|---|---|---|---|---|
| Green | Green | Blue | Green | Blue |
| Blue | Red | Green | Red | Green |
| Green | Green | Blue | Green | Blue |
| Blue | Red | Green | Red | Green |

FIG. 2C (C)

| Green | Green | Red | Green | Blue |
|---|---|---|---|---|
| Blue | Red | Green | Blue | Green |
| Green | Green | Red | Green | Blue |
| Blue | Red | Green | Blue | Green |
| Green | Green | Red | Green | Blue |

FIG. 3A (A)

| Magenta | Cyan | Cyan | Cyan | Magenta |
|---|---|---|---|---|
| Magenta | Cyan | Magenta | Magenta | Magenta |
| Magenta | Cyan | Cyan | Cyan | Yellow |
| Yellow | Cyan | Yellow | Yellow | Yellow |
| Yellow | Cyan | Cyan | Cyan | Yellow |

FIG. 3B (B)

| Blue | Blue | Green | Blue | Red |
|---|---|---|---|---|
| Red | Green | Blue | Red | Blue |
| Blue | Blue | Green | Blue | Red |
| Red | Green | Green | Red | Green |
| Green | Blue | Green | Blue | Red |

FIG. 3C (C)

| Red | Green | Blue | Green | Blue |
|---|---|---|---|---|
| Blue | Blue | Red | Blue | Red |
| Red | Green | Blue | Green | Green |
| Green | Blue | Red | Green | Red |
| Red | Green | Blue | Green | Green |

FIG. 4

PASSWORD ENTRY METHOD AND SYSTEM

BACKGROUND

Technical Field

The present invention relates to the field of communications technologies, and more particularly to a password entry method and system.

Related Art

At present, when users enter passwords on large-screen electronic devices (for example, televisions), there is a potential security risk. Especially for electronic devices that have a virtual keyboard displayed on the screen, when the user enters the password, other people can easily know the content entered by the user, making it difficult to ensure password entry security. Therefore, it is necessary to provide a secure password entry method.

SUMMARY

The present invention is mainly directed to a password entry method and system, which can improve password entry security.

An embodiment of the present invention provides a password entry method, including the following steps:

step 1: receiving, by an intelligent display terminal, a password entry instruction of a user, and randomly generating image data of a soft keyboard, where positions of characters in the soft keyboard are randomly arranged, and a color of a character in the soft keyboard is different from a color of a periphery of the character;

step 2: decomposing, by the intelligent display terminal, the image data of the soft keyboard into image data of a first soft keyboard and image data of a second soft keyboard by using a subtractive color process, where an image of the soft keyboard can be obtained by adding up an image color of the first soft keyboard and an image color of the second soft keyboard;

step 3: displaying, by the intelligent display terminal, an image of the first soft keyboard according to the image data of the first soft keyboard, and sending the image data of the second soft keyboard to a portable display terminal; and step 4: acquiring, by the portable display terminal, the image of the first soft keyboard that is displayed on the intelligent display terminal, processing the image of the first soft keyboard to obtain the image data of the first soft keyboard, then combining the image data of the first soft keyboard and the image data of the second soft keyboard by using an additive color process to restore the image of the soft keyboard, and displaying the image of the soft keyboard.

Preferably, the color of the character is one of cyan, magenta, and yellow, and the color of the periphery of the character is one of cyan, magenta, and yellow.

Preferably, in the step 2, the color of the character in the image data of the soft keyboard is decomposed into two of the three primary colors by using a subtractive color process, and the color of the periphery of the character in the image data of the soft keyboard is decomposed into two of the three primary colors by using a subtractive color process, so that the image data of the soft keyboard is decomposed into the image data of the first soft keyboard and the image data of the second soft keyboard.

Preferably, in the step 2, neighboring pixels constituting the periphery of the character and/or neighboring pixels constituting the character are in different colors of three primary colors in the first soft keyboard.

Preferably, in the step 4, the color of the character in the image data of the first soft keyboard and the color of the character in the image data of the second soft keyboard are combined by using an additive color process, and the color of the periphery of the character in the image data of the first soft keyboard and the color of the periphery of the character in the image data of the second soft keyboard are combined by using an additive color process, to restore the image of the soft keyboard.

Preferably, when the color of the character is cyan and the color of the periphery of the character is magenta, in the step 2, the color of the character in the image data of the soft keyboard is decomposed into blue and green by using a subtractive color process, and the color of the periphery of the character in the image data of the soft keyboard is decomposed into blue and red by using a subtractive color process, where the neighboring pixels constituting the character are respectively blue and green in the first soft keyboard, and the neighboring pixels constituting the periphery of the character are respectively blue and red in the first soft keyboard;

when the color of the character is yellow and the color of the periphery of the character is magenta, in the step 2, the color of the character in the image data of the soft keyboard is decomposed into red and green by using a subtractive color process, and the color of the periphery of the character in the image data of the soft keyboard is decomposed into blue and red by using a subtractive color process, where the neighboring pixels constituting the character are respectively red and green in the first soft keyboard, and the neighboring pixels constituting the periphery of the character are respectively blue and red in the first soft keyboard; and when the color of the character is yellow and the color of the periphery of the character is cyan, in the step 2, the color of the character in the image data of the soft keyboard is decomposed into red and green by using a subtractive color process, and the color of the periphery of the character in the image data of the soft keyboard is decomposed into blue and green by using a subtractive color process, where the neighboring pixels constituting the character are respectively red and green in the first soft keyboard, and the neighboring pixels constituting the periphery of the character are respectively blue and green in the first soft keyboard.

Preferably, the color of the character is one of cyan, magenta, and yellow, and the color of the periphery of the character is two of cyan, magenta, and yellow.

Further, an embodiment of the present invention provides a password entry system, including an intelligent display terminal and a portable display terminal, where the intelligent display terminal is configured to receive a password entry instruction of a user, and randomly generate image data of a soft keyboard, where positions of characters in the soft keyboard are randomly arranged, and a color of a character in the soft keyboard is different from a color of a periphery of the character;

the intelligent display terminal is further configured to decompose the image data of the soft keyboard into image data of a first soft keyboard and image data of a second soft keyboard by using a subtractive color process, where an image of the soft keyboard can be obtained by adding up an image color of the first soft keyboard and an image color of the second soft keyboard;

the intelligent display terminal is further configured to display an image of the first soft keyboard according to the image data of the first soft keyboard, and send the image data of the second soft keyboard to a portable display terminal; and the portable display terminal is configured to acquire the image of the first soft keyboard that is displayed on the intelligent display terminal, process the image of the first soft keyboard to obtain the image data of the first soft keyboard, then combine the image data of the first soft keyboard and the image data of the second soft keyboard by using an additive color process to restore the image of the soft keyboard, and display the image of the soft keyboard.

Preferably, the color of the character is one of cyan, magenta, and yellow, and the color of the periphery of the character is one of cyan, magenta, and yellow.

Preferably, the intelligent display terminal is further configured to decompose the color of the character in the image data of the soft keyboard into two of the three primary colors by using a subtractive color process, and decompose the color of the periphery of the character in the image data of the soft keyboard into two of the three primary colors by using a subtractive color process, so that the image data of the soft keyboard is decomposed into the image data of the first soft keyboard and the image data of the second soft keyboard, where neighboring pixels constituting the periphery of the character and/or neighboring pixels constituting the character are in different colors of three primary colors in the first soft keyboard; the portable display terminal is further configured to combine the color of the character in the image data of the first soft keyboard and the color of the character in the image data of the second soft keyboard by using an additive color process, and combine the color of the periphery of the character in the image data of the first soft keyboard and the color of the periphery of the character in the image data of the second soft keyboard by using an additive color process, to restore the image of the soft keyboard.

Compared with the prior art, by means of the password entry method of the present invention, when a user enters a password to the intelligent display terminal, the user can see the image of the soft keyboard on the portable display terminal and accordingly enter the password, while other people can see only the image of the first soft keyboard that is displayed on the intelligent display terminal and cannot see the complete image of the soft keyboard, and therefore cannot learn the content entered by the user. The password entry method of the present invention improves password entry security.

The objectives, features and advantages of the present invention will be described below in further detail with reference to embodiments and the accompanying drawings.

DETAILED DESCRIPTION

It should be appreciated that specific embodiments described herein are merely used to explain the present invention, and are not intended to limit the present invention.

A person skilled in the art may understand that in the following embodiments of the password entry method and system of the present invention, the intelligent display terminal may be a television, a computer, a tablet, or any other suitable terminal, and the portable display terminal may be electronic glasses, a mobile phone, a tablet or any other suitable terminal.

The present invention provides a password entry method.

Figure 1:
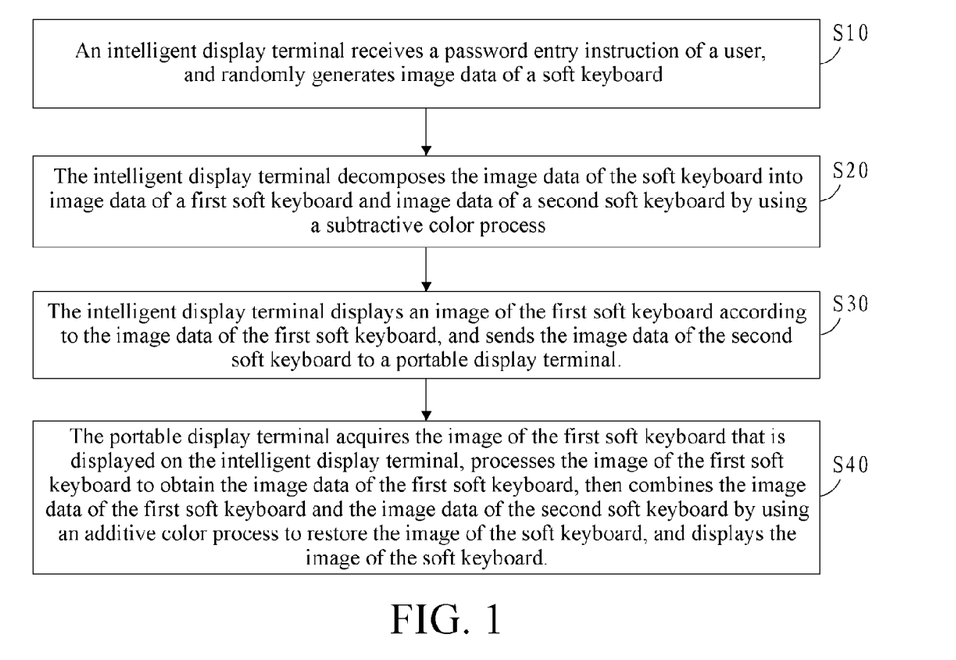
FIG. 1 is a schematic flowchart of a first embodiment of a password entry method according to the present invention.

Referring to FIG. 1, FIG. 1 is a schematic flowchart of a first embodiment of a password entry method according to the present invention.

In the first embodiment of the password entry method of the present invention, the method includes the following steps:

Step S10: An intelligent display terminal receives a password entry instruction of a user, and randomly generates image data of a soft keyboard, where positions of characters in the soft keyboard are randomly arranged, and a color of a character in the soft keyboard is different from a color of a periphery of the character.

The user may send the password entry instruction to the intelligent display terminal by using a terminal such as a remote control, or may send the password entry instruction to the intelligent display terminal by means of a touch screen, a button, a gesture or the like. The intelligent display terminal receives the password entry instruction of the user, and randomly generates image data of a soft keyboard, where positions of characters in the soft keyboard are randomly arranged, and a color of a character in the soft keyboard is different from a color of a periphery of the character, that is, a background color of the character, so as to highlight the character.

Step S20: The intelligent display terminal decomposes the image data of the soft keyboard into image data of a first soft keyboard and image data of a second soft keyboard by using a subtractive color process, where an image of the soft keyboard can be obtained by adding up an image color of the first soft keyboard and an image color of the second soft keyboard.

The intelligent display terminal may decompose each of the color of the character and the color of the periphery of the character in the image data of the soft keyboard into two different colors by using a subtractive color process, so that the image data of the soft keyboard is decomposed into the image data of the first soft keyboard and the image data of the second soft keyboard. For example, if the color of the character is one of cyan, magenta, and yellow, and the color of the periphery of the character is one of cyan, magenta, and yellow, the color of the character and the color of the periphery of the character may each be decomposed into two of three primary colors, so that the image data of the soft keyboard is decomposed into the image data of the first soft keyboard and the image data of the second soft keyboard. After decomposition, neighboring pixels constituting the periphery of the character and/or neighboring pixels constituting the character are in different colors of three primary colors in the first soft keyboard. Definitely, the color of the periphery of the character may also be two of cyan, magenta, and yellow, and the color of the character and the color of the periphery of the character are not limited to the foregoing colors, as long as they can be decomposed into two different colors.

Step S30: The intelligent display terminal displays an image of the first soft keyboard according to the image data of the first soft keyboard, and sends the image data of the second soft keyboard to a portable display terminal.

The intelligent display terminal establishes a communications connection with the portable display terminal. The intelligent display terminal displays the image of the first soft keyboard according to the image data of the first soft keyboard, and sends the image data of the second soft keyboard to the portable display terminal.

Step S40: The portable display terminal acquires the image of the first soft keyboard that is displayed on the intelligent display terminal, processes the image of the first soft keyboard to obtain the image data of the first soft keyboard, then combines the image data of the first soft keyboard and the image data of the second soft keyboard by using an additive color process to restore the image of the soft keyboard, and displays the image of the soft keyboard.

The portable display terminal acquires the image of the first soft keyboard that is displayed on the intelligent display terminal. An acquiring method may be as follows: the portable display terminal shoots the image of the first soft keyboard that is displayed on the intelligent display terminal via an image acquisition device (for example, a camera); or the portable display terminal sends an acquisition instruction to the intelligent display terminal, and receives the image of the first soft keyboard that is sent by the intelligent display terminal in response to the acquisition instruction. Definitely, other suitable methods may also be used. Because the image data of the first soft keyboard is obtained by using a subtractive color process from the image data of the soft keyboard, no character can be observed in the image of the first soft keyboard that is displayed according to the image data of the first soft keyboard. The portable display terminal processes the image of the first soft keyboard to obtain the image data of the first soft keyboard. Because the image data of the first soft keyboard and the image data of the second soft keyboard are obtained by using a subtractive color process from the image data of the soft keyboard, the color of the character in the image data of the first soft keyboard and the color of the character in the image data of the second soft keyboard can be combined by using an additive color process, and the color of the periphery of the character in the image data of the first soft keyboard and the color of the periphery of the character in the image data of the second soft keyboard can be combined by using an additive color process, to restore the image of the soft keyboard. The portable display terminal displays the restored image of the soft keyboard, for the user to enter a password according to the image of the soft keyboard.

Compared with the prior art, in this embodiment, when a user enters a password to the intelligent display terminal, the user can see the image of the soft keyboard on the portable display terminal and accordingly enter the password, while other people can see only the image of the first soft keyboard that is displayed on the intelligent display terminal and cannot see the complete image of the soft keyboard, and therefore cannot learn the content entered by the user. In addition, because characters on the soft keyboard are randomly arranged, other people who can see the image of the first soft keyboard cannot learn the characters entered by the user by memorizing the positions of characters on the keyboard. Therefore, this embodiment improves password entry security.

In this embodiment, before the displaying, by the intelligent display terminal, an image of the first soft keyboard according to the image data of the first soft keyboard, and sending the image data of the second soft keyboard to a portable display terminal, the method includes:

connecting, by the intelligent display terminal, to the portable display terminal in a paired manner.

The intelligent display terminal and the portable display terminal perform mutual authentication, and after the authentication succeeds, a communications connection is established between the intelligent display terminal and the portable display terminal. An authentication method may be to authenticate keys, device information and the like that are sent by them to each other. The communications connection between the intelligent display terminal and the portable display terminal may be implemented in a wired manner, or may be implemented in a wireless manner, for example, implemented by means of Wireless Fidelity (WIFI) or Near Field Communication (NFC).

Figure 2A:
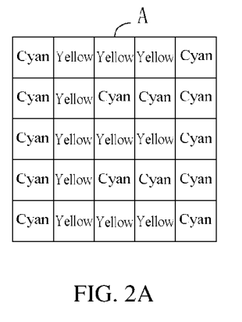
FIGS. 2A-C are diagrams illustrating distribution of pixels that constitute a character and a periphery of the character.
Figure 2B:
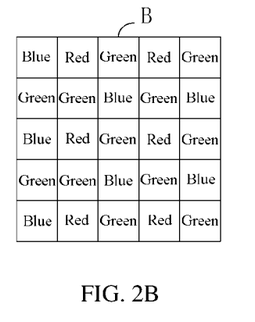
Figure 2C:
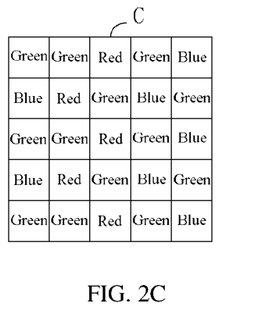

Referring to FIGS. 2A-C, FIGS. 2A-C illustrates an example of decomposition of the image data of the soft keyboard into the image data of the first soft keyboard and the image data of the second soft keyboard by using a subtractive color process.

FIG. 2A is a diagram illustrating distribution of pixels that constitute a character E and a periphery of the character E in the image data of the soft keyboard; FIG. 2B and FIG. 2C are respectively pixel distribution diagrams of the image data of the first soft keyboard and the image data of the second soft keyboard that are obtained by decomposing the image data of the soft keyboard by using a subtractive color process.

In FIG. 2A, yellow pixels constitute the character "E", and cyan pixels constitute the periphery of the character "E". After a subtractive color process is performed on the cyan pixels, blue pixels and green pixels are obtained correspondingly; after a subtractive color process is performed on the yellow pixels, green pixels and red pixels are obtained correspondingly. Therefore, after a subtractive color process is performed on the pixels that constitute the character and the periphery of the character in FIG. 2A, the pixels in FIG. 2B and FIG. 2C are obtained correspondingly. It can be seen that the character "E" is not directly visible in FIG. 2B and FIG. 2C, so that other people cannot easily see the character on the first soft keyboard.

In this embodiment, the color of the character in the image data of the soft keyboard, which is yellow, is decomposed into red and green by using a subtractive color process, and the periphery of the character in the image data of the soft keyboard, which is cyan, is decomposed into blue and green by using a subtractive color process, so that the image data of the soft keyboard is decomposed into the image data of the first soft keyboard and the image data of the second soft keyboard; and the neighboring pixels constituting the character and the neighboring pixels constituting the periphery of the character are in different colors of three primary colors in the first soft keyboard. Therefore, the character E cannot be observed in the first soft keyboard. This embodiment helps further improve password entry security.

If the color of the character is cyan and the color of the periphery of the character is magenta in FIGS. 2A-C, the color of the character in the image data of the soft keyboard is decomposed into blue and green by using a subtractive color process, and the color of the periphery of the character in the image data of the soft keyboard is decomposed into blue and red by using a subtractive color process; and the neighboring pixels constituting the character are respectively blue and green in the first soft keyboard, and the neighboring pixels constituting the periphery of the character are respectively blue and red in the first soft keyboard.

If the color of the character is yellow and the color of the periphery of the character is magenta in FIGS. 2A-C, the color of the character in the image data of the soft keyboard is decomposed into red and green by using a subtractive color process, and the color of the periphery of the character in the image data of the soft keyboard is decomposed into blue and red by using a subtractive color process; and the neighboring pixels constituting the character are respectively red and green in the first soft keyboard, and the neighboring pixels constituting the periphery of the character are respectively blue and red in the first soft keyboard.

As mentioned above, the color of the character may be one of cyan, magenta, and yellow, and the color of the periphery of the character may be two of cyan, magenta, and yellow.

Figure 3A:
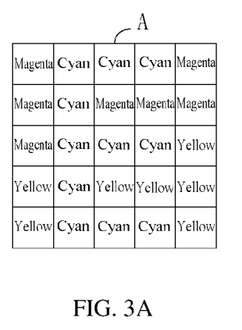
FIGS. 3A-C are diagrams illustrating distribution of pixels that constitute a character and a periphery of the character.
Figure 3B:
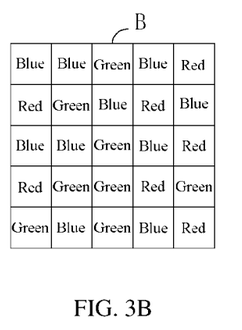
Figure 3C:
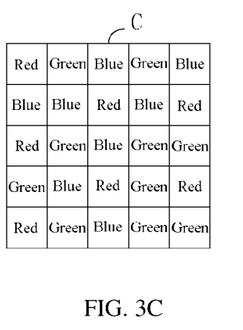

Referring to FIGS. 3A-C, FIGS. 3A-C illustrate another example of decomposition of the image data of the soft keyboard into the image data of the first soft keyboard and the image data of the second soft keyboard by using a subtractive color process.

FIG. 3A is a diagram illustrating distribution of pixels that constitute a character E and a periphery of the character E in the image data of the soft keyboard; FIG. 3B and FIG. 3C are respectively pixel distribution diagrams of the image data of the first soft keyboard and the image data of the second soft keyboard that are obtained by decomposing the image data of the soft keyboard by using a subtractive color process.

In FIG. 3A, cyan pixels constitute the character "E", and magenta pixels and yellow pixels constitute the periphery of the character "E". After a subtractive color process is performed on the cyan pixels, blue pixels and green pixels are obtained correspondingly; after a subtractive color process is performed on the yellow pixels, green pixels and red pixels are obtained correspondingly; after a subtractive color process is performed on the magenta pixels, blue pixels and red pixels are obtained correspondingly. Therefore, after a subtractive color process is performed on the pixels that constitute the character and the periphery of the character in FIG. 3A, the pixels in FIG. 3B and FIG. 3C are obtained correspondingly. It can be seen that compared with the pixels in FIG. 2B and FIG. 2C, the distribution of colors of pixels in FIG. 3B and FIG. 3C is more complex and more irregular.

In this embodiment, the periphery of the character has two colors; therefore, the distribution of colors of pixels in the image of the first soft keyboard that is obtained through decomposition is more complex, which helps further improve password entry security.

The present invention further provides a password entry system.

Figure 4:
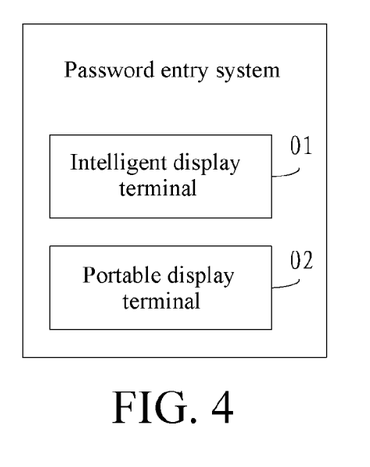
FIG. 4 is a schematic diagram of functional modules of a password entry system according to the present invention.

Referring to FIG. 4, FIG. 4 is a schematic diagram of functional modules of a first embodiment of a password entry system according to the present invention.

In the first embodiment of the password entry system of the present invention, the system includes an intelligent display terminal 01 and a portable display terminal 02.

The intelligent display terminal 01 is configured to receive a password entry instruction of a user, and randomly generate image data of a soft keyboard, where positions of characters in the soft keyboard are randomly arranged, and a color of a character in the soft keyboard is different from a color of a periphery of the character.

The user may send the password entry instruction to the intelligent display terminal 01 by using a terminal such as a remote control, or may send the password entry instruction to the intelligent display terminal 01 by means of a touch screen, a button, a gesture or the like. The intelligent display terminal 01 receives the password entry instruction of the user, and randomly generates image data of a soft keyboard, where positions of characters in the soft keyboard are randomly arranged, and a color of a character in the soft keyboard is different from a color of a periphery of the character, that is, a background color of the character, so as to highlight the character.

The intelligent display terminal 01 is further configured to decompose the image data of the soft keyboard into image data of a first soft keyboard and image data of a second soft keyboard by using a subtractive color process, where an image of the soft keyboard can be obtained by adding up an image color of the first soft keyboard and an image color of the second soft keyboard.

The intelligent display terminal may decompose each of the color of the character and the color of the periphery of the character in the image data of the soft keyboard into two different colors by using a subtractive color process, so that the image data of the soft keyboard is decomposed into the image data of the first soft keyboard and the image data of the second soft keyboard. For example, if the color of the character is one of cyan, magenta, and yellow, and the color of the periphery of the character is one of cyan, magenta, and yellow, the color of the character and the color of the periphery of the character may each be decomposed into two of three primary colors, so that the image data of the soft keyboard is decomposed into the image data of the first soft keyboard and the image data of the second soft keyboard. After decomposition, neighboring pixels constituting the periphery of the character and/or neighboring pixels constituting the character are in different colors of three primary colors in the first soft keyboard. Definitely, the color of the periphery of the character may also be two of cyan, magenta, and yellow, and the color of the character and the color of the periphery of the character are not limited to the foregoing colors, as long as they can be decomposed into two different colors.

The intelligent display terminal 01 is further configured to display an image of the first soft keyboard according to the image data of the first soft keyboard, and send the image data of the second soft keyboard to a portable display terminal 02.

The intelligent display terminal 01 establishes a communications connection with the portable display terminal 02. The intelligent display terminal displays the image of the first soft keyboard according to the image data of the first soft keyboard, and sends the image data of the second soft keyboard to the portable display terminal 02.

The portable display terminal 02 is configured to acquire the image of the first soft keyboard that is displayed on the intelligent display terminal 01, process the image of the first soft keyboard to obtain the image data of the first soft keyboard, then combine the image data of the first soft keyboard and the image data of the second soft keyboard by using an additive color process to restore the image of the soft keyboard, and display the image of the soft keyboard.

The portable display terminal 02 acquires the image of the first soft keyboard that is displayed on the intelligent display terminal 01. An acquiring method may be as follows: the portable display terminal 02 shoots the image of the first soft keyboard that is displayed on the intelligent display terminal 01 via an image acquisition device (for example, a camera);

or the portable display terminal 02 sends an acquisition instruction to the intelligent display terminal 01, and receives the image of the first soft keyboard that is sent by the intelligent display terminal 01 in response to the acquisition instruction. Definitely, other suitable methods may also be used. Because the image data of the first soft keyboard is obtained by using a subtractive color process from the image data of the soft keyboard, no character can be observed in the image of the first soft keyboard that is displayed according to the image data of the first soft keyboard. The portable display terminal 02 processes the image of the first soft keyboard to obtain the image data of the first soft keyboard. Because the image data of the first soft keyboard and the image data of the second soft keyboard are obtained by using a subtractive color process from the image data of the soft keyboard, the color of the character in the image data of the first soft keyboard and the color of the character in the image data of the second soft keyboard can be combined by using an additive color process, and the color of the periphery of the character in the image data of the first soft keyboard and the color of the periphery of the character in the image data of the second soft keyboard can be combined by using an additive color process, to restore the image of the soft keyboard. The portable display terminal 02 displays the restored image of the soft keyboard, for the user to enter a password according to the image of the soft keyboard.

Compared with the prior art, in this embodiment, when a user enters a password to the intelligent display terminal 01, the user can see the image of the soft keyboard on the portable display terminal 02 and accordingly enter the password, while other people can see only the image of the first soft keyboard that is displayed on the intelligent display terminal 01 and cannot see the complete image of the soft keyboard, and therefore cannot learn the content entered by the user. In addition, because characters on the soft keyboard are randomly arranged, other people who can see the image of the first soft keyboard cannot learn the characters entered by the user by memorizing the positions of characters on the keyboard. Therefore, this embodiment improves password entry security.

In this embodiment, the intelligent display terminal 01 and the portable display terminal 02 are further configured to connect to each other in a paired manner.

The intelligent display terminal 01 and the portable display terminal 02 perform mutual authentication, and after the authentication succeeds, a communications connection is established between the intelligent display terminal 01 and the portable display terminal 02. An authentication method may be to authenticate keys, device information and the like that are sent by them to each other. The communications connection between the intelligent display terminal 01 and the portable display terminal 02 may be implemented in a wired manner, or may be implemented in a wireless manner, for example, implemented by means of Wireless Fidelity (WIFI) or Near Field Communication (NFC).

The foregoing descriptions are merely preferred embodiments of the present invention but are not intended to limit the patent scope of the present invention. Any equivalent modifications made to the structures or processes based on the content of the specification and the accompanying drawings of the present invention for direct or indirect use in other relevant technical fields shall also be encompassed in the patent protection scope of the present invention.

What is claimed is:

1. A password entry method, comprising the following steps:

step 1: receiving, by an intelligent display terminal, a password entry instruction of a user, and randomly generating image data of a soft keyboard, wherein positions of characters in the soft keyboard are randomly arranged, and a color of a character in the soft keyboard is different from a color of a periphery of the character;

step 2: decomposing, by the intelligent display terminal, the image data of the soft keyboard in the intelligent display terminal into image data of a first soft keyboard and image data of a second soft keyboard by using a subtractive color process, wherein an image of the soft keyboard is obtained by adding up an image color of the first soft keyboard and an image color of the second soft keyboard;

step 3: connecting, by the intelligent display terminal, to a portable display terminal in a paired manner, displaying, by the intelligent display terminal, an image of the first soft keyboard according to the image data of the first soft keyboard, and sending the image data of the second soft keyboard to the portable display terminal; and step 4: acquiring, by the portable display terminal, the image of the first soft keyboard that is displayed on the intelligent display terminal, processing the image of the first soft keyboard to obtain the image data of the first soft keyboard, then combining the image data of the first soft keyboard and the image data of the second soft keyboard by using an additive color process to restore the image of the soft keyboard, and displaying the image of the soft keyboard;

wherein the color of the character is one of cyan, magenta, and yellow, and the color of the periphery of the character is one of cyan, magenta, and yellow;

wherein when the color of the character is cyan and the color of the periphery of the character is magenta, in the step 2, the color of the character in the image data of the soft keyboard is decomposed into blue and green by using a subtractive color process, and the color of the periphery of the character in the image data of the soft keyboard is decomposed into blue and red by using a subtractive color process, wherein the neighboring pixels constituting the character are respectively blue and green in the first soft keyboard, and the neighboring pixels constituting the periphery of the character are respectively blue and red in the first soft keyboard;

when the color of the character is yellow and the color of the periphery of the character is magenta, in the step 2, the color of the character in the image data of the soft keyboard is decomposed into red and green by using a subtractive color process, and the color of the periphery of the character in the image data of the soft keyboard is decomposed into blue and red by using a subtractive color process, wherein the neighboring pixels constituting the character are respectively red and green in the first soft keyboard, and the neighboring pixels constituting the periphery of the character are respectively blue and red in the first soft keyboard; and when the color of the character is yellow and the color of the periphery of the character is cyan, in the step 2, the color of the character in the image data of the soft keyboard is decomposed into red and green by using a subtractive color process, and the color of the periphery of the character in the image data of the soft keyboard is decomposed into blue and green by using a subtractive color process, wherein the neighboring pixels constituting the character are respectively red and green in the first soft keyboard, and the neighboring pixels constituting the periphery of the character are respectively blue and green in the first soft keyboard.

2. The password entry method according to claim 1, wherein in the step 4, the color of the character in the image data of the first soft keyboard and the color of the character in the image data of the second soft keyboard are combined by using an additive color process, and the color of the periphery of the character in the image data of the first soft keyboard and the color of the periphery of the character in the image data of the second soft keyboard are combined by using an additive color process, to restore the image of the soft keyboard.

3. The password entry method according to claim 1, wherein the connecting, by the intelligent display terminal, to the portable display terminal in a paired manner in the step 3 comprises:
performing, by the intelligent display terminal and the portable display terminal, mutual authentication by using keys and device information that are sent by the intelligent display terminal and the portable display terminal to each other, and after the authentication succeeds, establishing a communications connection between the intelligent display terminal and the portable display terminal.

4. The password entry method according to claim 3, wherein the communications connection is a wired or wireless connection.

5. A password entry system, comprising an intelligent display terminal and a portable display terminal, wherein
the intelligent display terminal is configured to receive a password entry instruction of a user, and randomly generate image data of a soft keyboard, wherein positions of characters in the soft keyboard are randomly arranged, and a color of a character in the soft keyboard is different from a color of a periphery of the character;
the intelligent display terminal is further configured to decompose the image data of the soft keyboard in the intelligent display terminal into image data of a first soft keyboard and image data of a second soft keyboard by using a subtractive color process, wherein an image of the soft keyboard is obtained by adding up an image color of the first soft keyboard and an image color of the second soft keyboard;
the intelligent display terminal is further configured to connect to a portable display terminal in a paired manner, display an image of the first soft keyboard according to the image data of the first soft keyboard, and send the image data of the second soft keyboard to the portable display terminal; and
the portable display terminal is configured to acquire the image of the first soft keyboard that is displayed on the intelligent display terminal, process the image of the first soft keyboard to obtain the image data of the first soft keyboard, then combine the image data of the first soft keyboard and the image data of the second soft keyboard by using an additive color process to restore the image of the soft keyboard, and display the image of the soft keyboard;
wherein the color of the character is one of cyan, magenta, and yellow, and the color of the periphery of the character is one of cyan, magenta, and yellow; wherein
when the color of the character is cyan and the color of the periphery of the character is magenta, the color of the character in the image data of the soft keyboard is decomposed into blue and green by using a subtractive color process, and the color of the periphery of the character in the image data of the soft keyboard is decomposed into blue and red by using a subtractive color process, wherein the neighboring pixels constituting the character are respectively blue and green in the first soft keyboard, and the neighboring pixels constituting the periphery of the character are respectively blue and red in the first soft keyboard;
when the color of the character is yellow and the color of the periphery of the character is magenta, the color of the character in the image data of the soft keyboard is decomposed into red and green by using a subtractive color process, and the color of the periphery of the character in the image data of the soft keyboard is decomposed into blue and red by using a subtractive color process, wherein the neighboring pixels constituting the character are respectively red and green in the first soft keyboard, and the neighboring pixels constituting the periphery of the character are respectively blue and red in the first soft keyboard; and
when the color of the character is yellow and the color of the periphery of the character is cyan, the color of the character in the image data of the soft keyboard is decomposed into red and green by using a subtractive color process, and the color of the periphery of the character in the image data of the soft keyboard is decomposed into blue and green by using a subtractive color process, wherein the neighboring pixels constituting the character are respectively red and green in the first soft keyboard, and the neighboring pixels constituting the periphery of the character are respectively blue and green in the first soft keyboard.

6. The password entry system according to claim 5, wherein the portable display terminal is further configured to combine the color of the character in the image data of the first soft keyboard and the color of the character in the image data of the second soft keyboard by using an additive color process, and combine the color of the periphery of the character in the image data of the first soft keyboard and the color of the periphery of the character in the image data of the second soft keyboard by using an additive color process, to restore the image of the soft keyboard.

7. The password entry system according to claim 5, wherein the connecting, by the intelligent display terminal, to the portable display terminal in a paired manner comprises:
performing, by the intelligent display terminal and the portable display terminal, mutual authentication by using keys and device information that are sent by the intelligent display terminal and the portable display terminal to each other, and after the authentication succeeds, establishing a communications connection between the intelligent display terminal and the portable display terminal.

8. The password entry system according to claim 7, wherein the communications connection is a wired or wireless connection.

9. A password entry method, comprising the following steps:
step 1: receiving, by an intelligent display terminal, a password entry instruction of a user, and randomly generating image data of a soft keyboard, wherein positions of characters in the soft keyboard are randomly arranged, and a color of a character in the soft keyboard is different from a color of a periphery of the character;

step 2: decomposing, by the intelligent display terminal, the image data of the soft keyboard in the intelligent display terminal into image data of a first soft keyboard and image data of a second soft keyboard by using a subtractive color process, wherein an image of the soft keyboard is obtained by adding up an image color of the first soft keyboard and an image color of the second soft keyboard;

step 3: connecting, by the intelligent display terminal, to a portable display terminal in a paired manner, displaying, by the intelligent display terminal, an image of the first soft keyboard according to the image data of the first soft keyboard, and sending the image data of the second soft keyboard to the portable display terminal; and step 4: acquiring, by the portable display terminal, the image of the first soft keyboard that is displayed on the intelligent display terminal, processing the image of the first soft keyboard to obtain the image data of the first soft keyboard, then combining the image data of the first soft keyboard and the image data of the second soft keyboard by using an additive color process to restore the image of the soft keyboard, and displaying the image of the soft keyboard;

wherein the color of the character is one of cyan, magenta, and yellow, and the color of the periphery of the character is two of cyan, magenta, and yellow; and in the step 2, after the subtractive color process is performed on cyan pixels, blue pixels and green pixels are obtained correspondingly, after the subtractive color process is performed on yellow pixels, green pixels and red pixels are obtained correspondingly, after the subtractive color process is performed on magenta pixels, blue pixels and red pixels are obtained correspondingly, and neighboring pixels constituting the character are in different colors in the first soft keyboard.

10. The password entry method according to claim 9, wherein in the step 2, neighboring pixels constituting the periphery of the character are in different colors in the first soft keyboard.

\* \* \* \* \*